United States Patent
Daniek

(10) Patent No.: US 6,676,337 B2
(45) Date of Patent: Jan. 13, 2004

(54) TOOL FOR CHAMFERING AND DEBURRING THE END FACE TOOTH EDGES OF GEAR WHEELS

(75) Inventor: Thomas Daniek, Greifenberg (DE)

(73) Assignee: The Gleason Works, Rochester, NY (US)

( * ) Notice: Subject to any disclaimer, the term of this patent is extended or adjusted under 35 U.S.C. 154(b) by 47 days.

(21) Appl. No.: 10/141,726

(22) Filed: May 9, 2002

(65) Prior Publication Data

US 2002/0197118 A1 Dec. 26, 2002

(30) Foreign Application Priority Data

Jun. 21, 2001 (DE) ........................................ 101 29 853

(51) Int. Cl.$^7$ .............................. B23F 19/10; B26D 1/12
(52) U.S. Cl. .............................. 407/27; 407/20; 409/49; 409/8
(58) Field of Search .............................. 407/27, 29, 20; 409/8, 9

(56) References Cited

U.S. PATENT DOCUMENTS

| | | | |
|---|---|---|---|
| 5,154,553 | * 10/1992 | Baumstark | 409/8 |
| 6,050,755 | * 4/2000 | Huber et al. | 409/9 |
| 6,571,475 | * 6/2003 | Tomei | 29/893.32 |

FOREIGN PATENT DOCUMENTS

DE 4441927 3/1996

OTHER PUBLICATIONS

English Translation of Official Action of May 8, 2002 issued by German Patent Office in DE 10129853.6.
Patent Abstracts of Japan, Publication No. 62162419, published Jul. 1987, Application No. 61005509, Filed Jan. 1986, Kobe Steel Ltd.
Gleason–HURTH Brochure,"Rotary Deburring Tools, Wet or Dry Machining" Aug. 1997.

* cited by examiner

Primary Examiner—Willmon Fridie, Jr.
(74) Attorney, Agent, or Firm—Robert L. McDowell

(57) ABSTRACT

A tool for chamfering and deburring of end face tooth edges of spur and helical gears comprising (1) at least one rolling deburring wheel for machining the tooth edges, arranged at an end face relative to the workpiece and meshing therewith, and (2) a toothed spacer wheel, positioned axially adjacent to the rolling deburring wheel and fixedly connected thereto and meshing with the workpiece. The spacer wheel being formed as a driving wheel about a portion of its periphery and as a smoothing wheel for machining the edge zones of the tooth flanks about the remaining portion of the periphery. The spacer wheel is divided into at least two discs which are connected to one another so as to be rotationally adjustable.

4 Claims, 7 Drawing Sheets

TOOL FOR CHAMFERING AND DEBURRING THE END FACE TOOTH EDGES OF GEAR WHEELS

FIELD OF THE INVENTION

The invention relates to a tool for chamfering and deburring end face tooth edges of spur and helical gears.

BACKGROUND OF THE INVENTION

A tool for chamfering and deburring is known from the company brochure "Gleason-HURTH Rotary Deburring Tools". In the case of gear wheels produced by a cutting operation a burr is formed on the end face tooth edges which must be removed for various reasons. Such a burr is an obstruction because in the subsequent working steps a plane surface, for example, the end face of the gear wheel, is designated to serve as a clamping or reference surface. A special risk for the toothing is a hardened burr which, at the latest during running within the gear, will break off and can damage the tooth flanks. Aside from the fact that a remaining burr also presents a risk for injury when handling the workpieces. For these reasons, already for a long time, numerous methods and devices have been used for removing the burr.

However, it is usually not sufficient to remove only the burrs. During hardening, for example, there is the risk that the pointed edge becomes glass-hard as a result of excessive carburization and will then break off under load. Therefore, the end face tooth edge must be provided additionally with a chamfer. Moreover, it protects the active tooth surface against damage. This goal is achieved with the device of the aforementioned kind in that material of the workpiece on the edge between the tooth flank and the end face is displaced in order to generate a single-flank or double-flank chamfer. This plastic deformation causes the material of the workpiece to be displaced by the rolling deburring wheel to the end face and into the tooth flank so that a so-called secondary burr results. This secondary burr has been removed in the past by means of a cutter at the end face and by means of a toothed smoothing wheel meshing with the workpiece. In the prior art, this smoothing wheel was a component independent of the driving wheel fixedly connected to the rolling deburring wheel or wheels. Already known from the aforementioned company brochure is also a tool of the aforementioned kind in which the spacer wheel fixedly connected with the rolling deburring wheel or wheels takes over the function of the driving wheel as well as the function of the smoothing wheel. This could also be referred to as a combined driving and smoothing wheel.

In order to obtain optimal smoothing results in wet and dry processing by means of the peripheral area of the spacer wheel functioning as the smoothing wheel, the helix angle of the toothing of the smoothing area must match exactly that of the workpiece. When this prerequisite is not fulfilled, then burr deformations are produced in the tooth flanks of the workpiece which during a subsequent hard fine machining cause a premature wear of the fine machining tool. However, according to practical experience, the helix angle of the workpieces to be machined changes constantly for reasons which include the following:

1. Different behavior of the materials during hardening.
2. Different hardening furnaces are used.
3. Manufacturing tolerances during hobbing.

Since the user of the tools of the aforementioned kind has no other possibility on site than to change the center distance in the deburring machine, this approach is usually selected. However, this approach is wrong. When reducing the axle spacing the material on the workpiece is compressed such that a material removal for a subsequent hard fine machining is made very difficult. This means also a premature wear of the tool. When, however, the center distance is increased, the burr deformation will grow correspondingly.

It is an object of the invention to further develop the tool of the aforementioned kind such that an adaptation to variations of the helix angles of the workpieces to be machined is made possible.

SUMMARY OF THE INVENTION

In the present invention, the spacer wheel is divided into at least two discs which are connected to one another so as to be adjustable rotationally relative to one another. The configuration according to the invention of the tool enables the user to react immediately to variations of the helix angle on the workpiece. For this purpose, the relative position of the two discs is changed such that the teeth arranged in the smoothing area will contact properly the tooth flanks of the workpiece and remove the secondary burr present thereat. Since each one of the two discs machines only one of the two edges of each tooth flank of the workpiece, the hollow grinding of the flank lines required for a single-part smoothing wheel can be omitted.

The two discs of the tool according to the invention are preferably displaced in the circumferential direction relative to one another such that the area which serves as a smoothing wheel of the one disc is positioned opposite the area of the other disc serving as a driving wheel. This ensures a much more quiet running during machining. Moreover, the smoothing and deburring result of each planar side can be adjusted in a targeted way. Also, the chamfer widths and the helix angle of the smoothing area can be optimized independently from one another.

In an especially advantageous embodiment of the tool according to the invention, it is provided that one disc has two threaded bores which are displaced in the circumferential direction, that the other disc has two bores which have a different angular spacing relative to one another than the threaded bores and partially overlap them, and that adjusting screws with a conical face end are screwed into the threaded bores of the one disc in such a way that the conical face ends contact the edges of the bores of the other disc only within in a partial area. By tightening one screw and correspondingly unscrewing the other screw, a relative rotation of the two discs of the tool in one direction can be achieved.

DETAILED DESCRIPTION OF HE PREFERRED EMBODIMENTS

Figure 1:
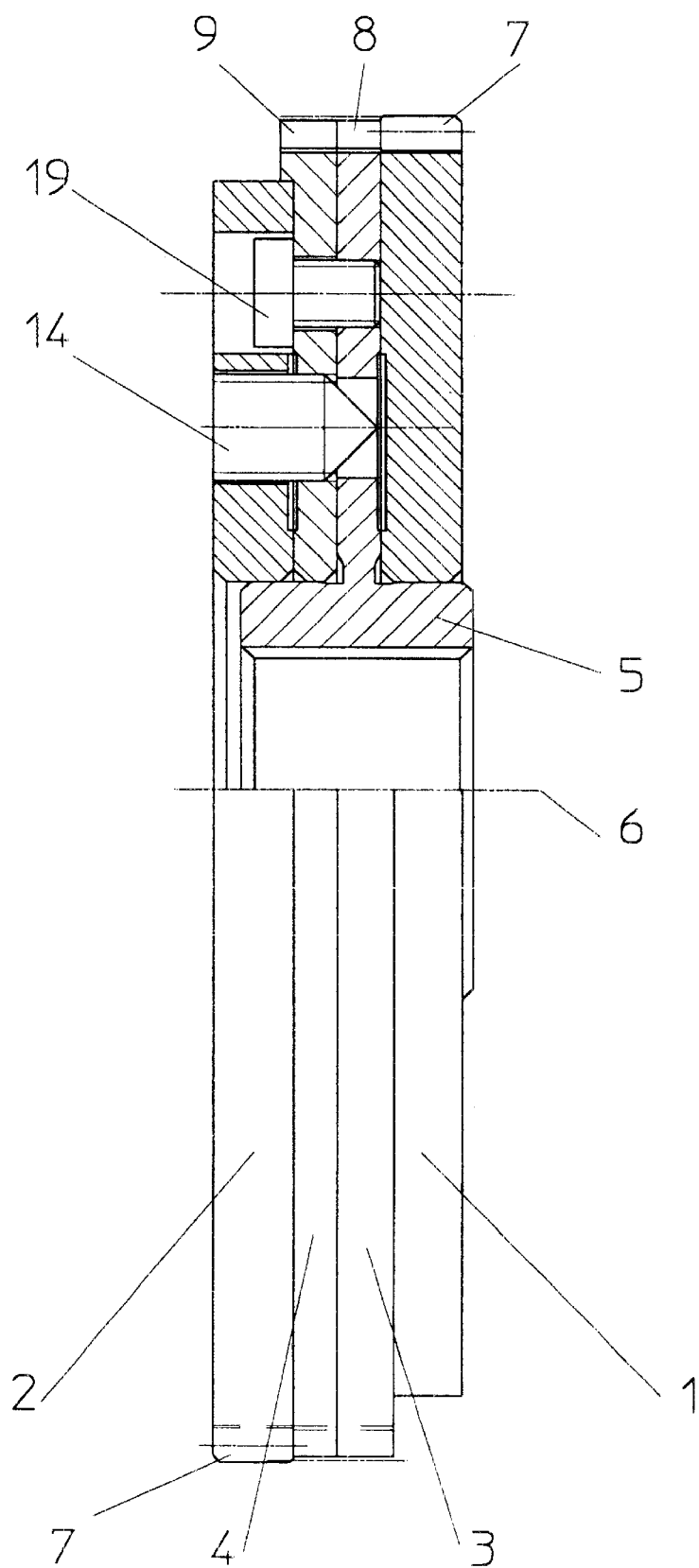
FIG. 1 illustrates a tool for machining the face side edges of gear wheels, partially in section and partially in an elevated view.

A preferred embodiment of the invention is illustrated in the drawings and will be explained in more detail in the following.

Figure 2:
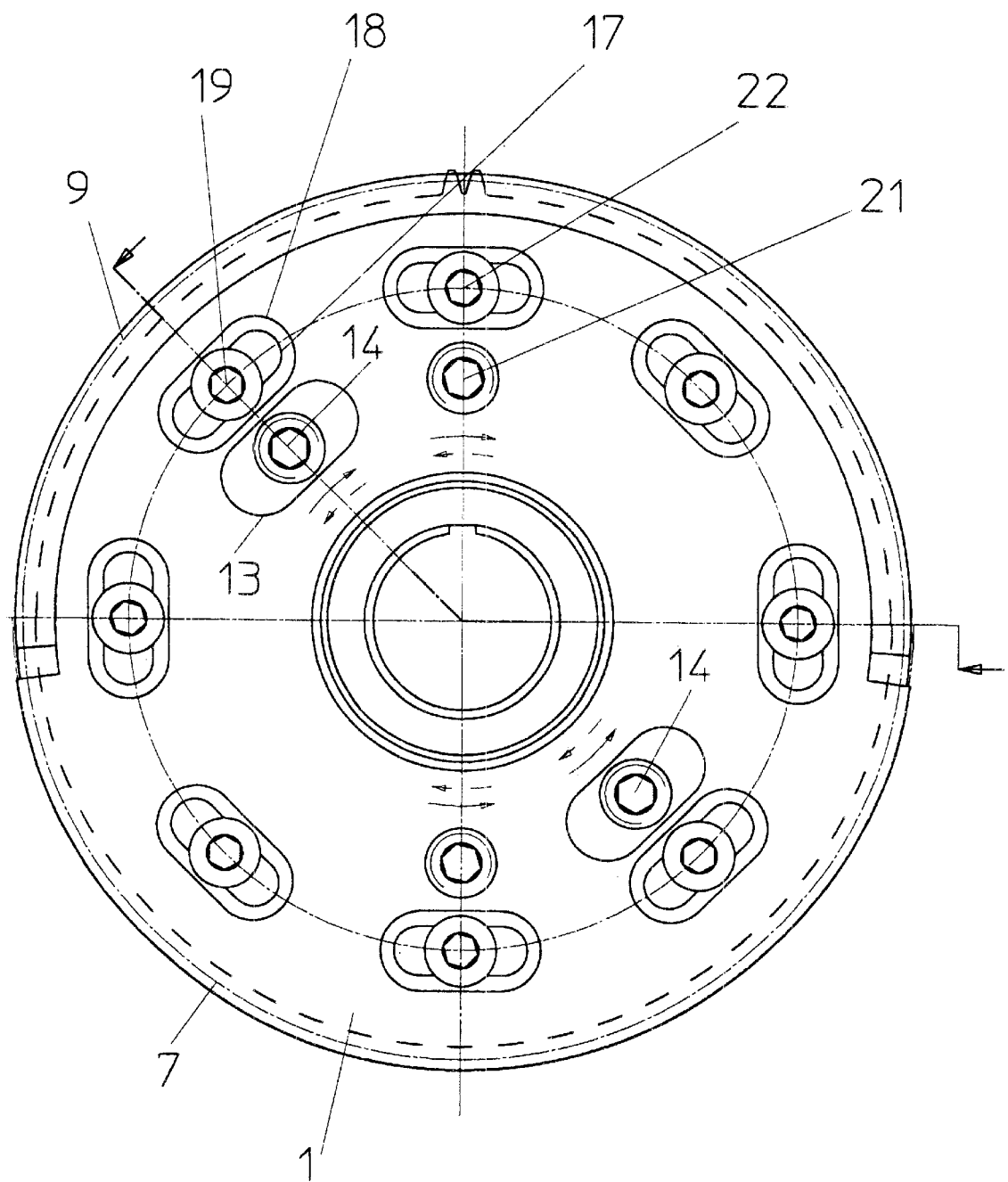
FIG. 2 a side view of the tool according to FIG. 1.
Figure 3:
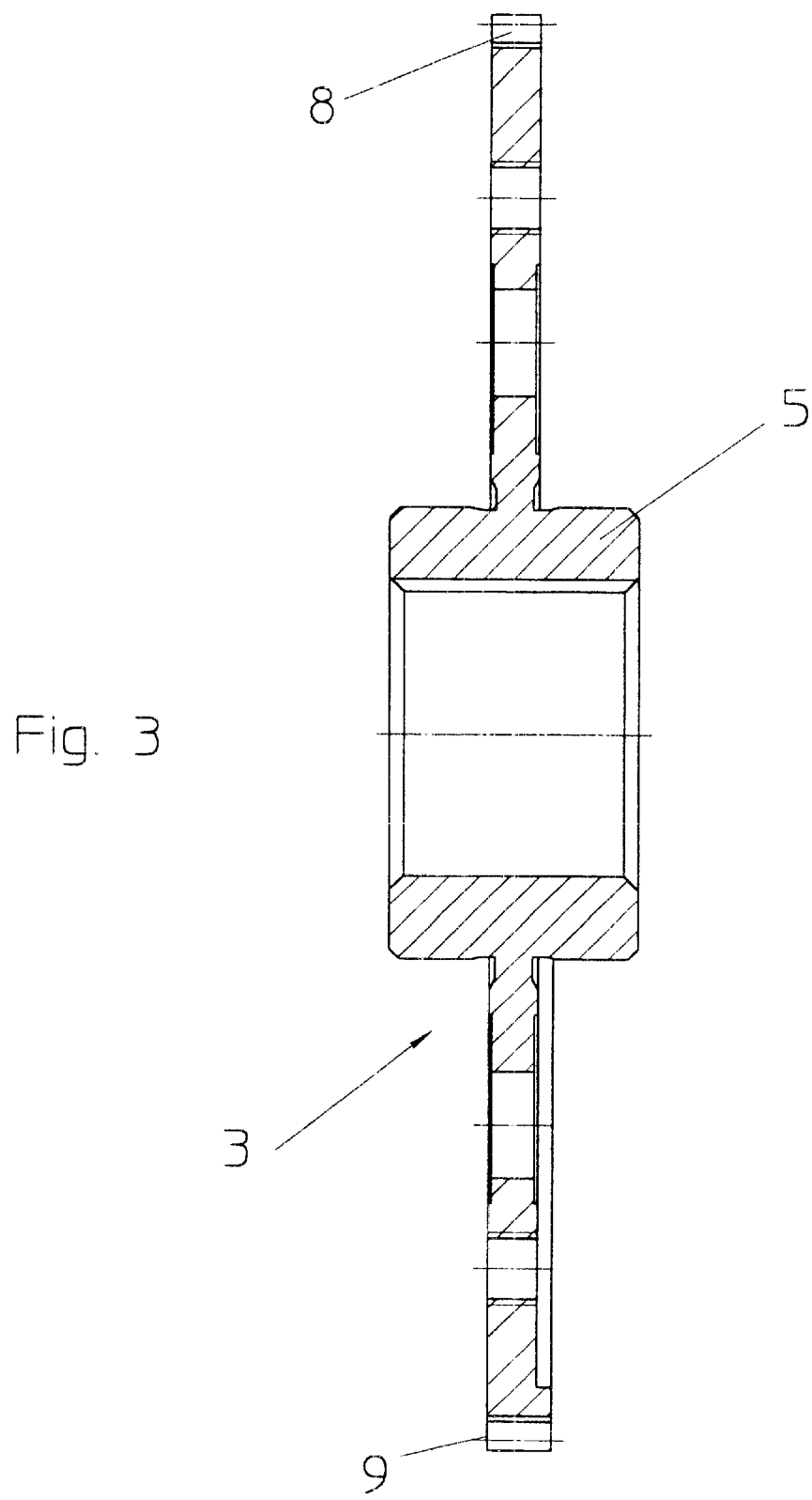
FIG. 3 an axial section of a first disc part of a combined driving and smoothing wheel.
Figure 4:
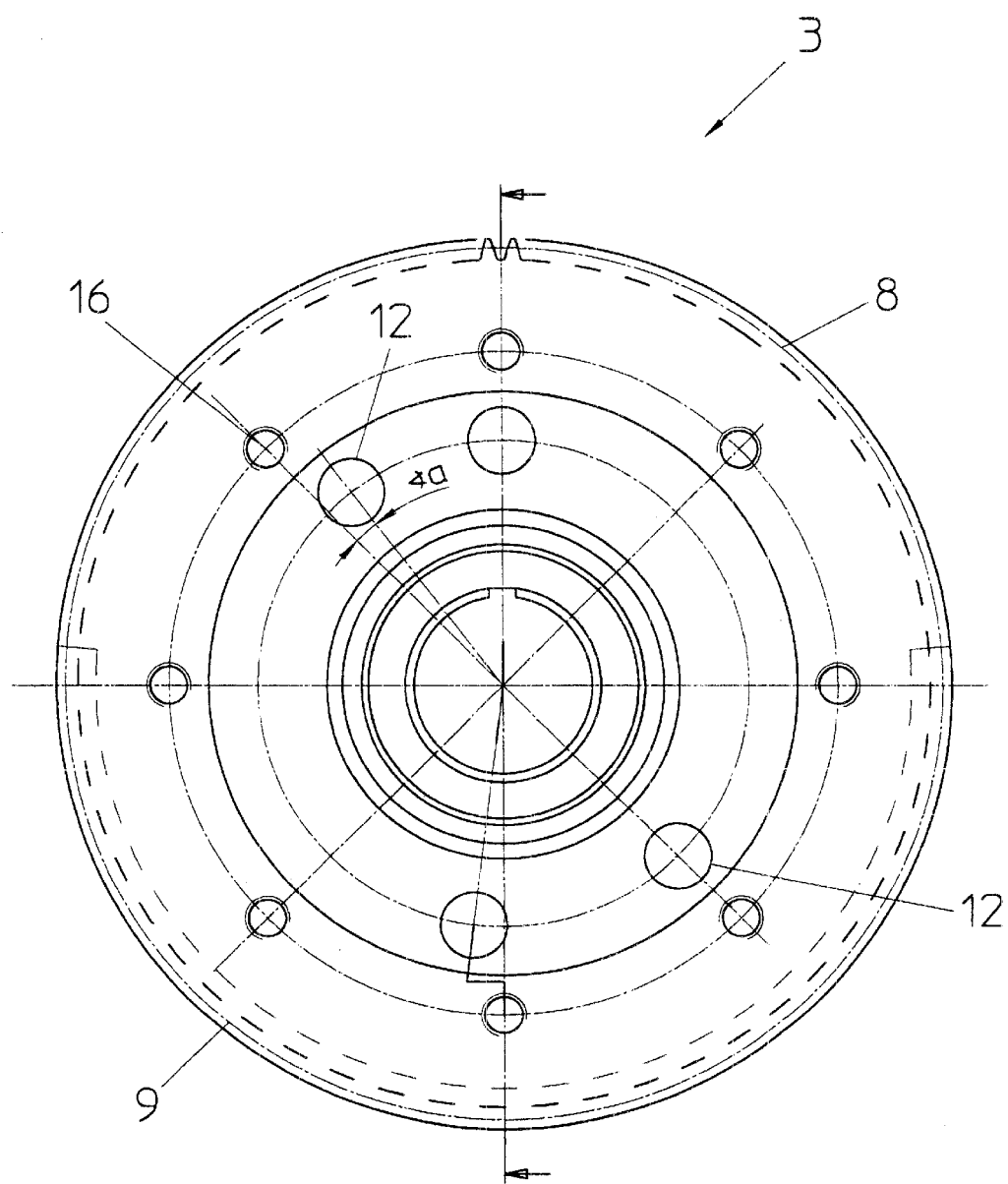
FIG. 4 a side view of the first disc part according to FIG. 3.
Figure 5:
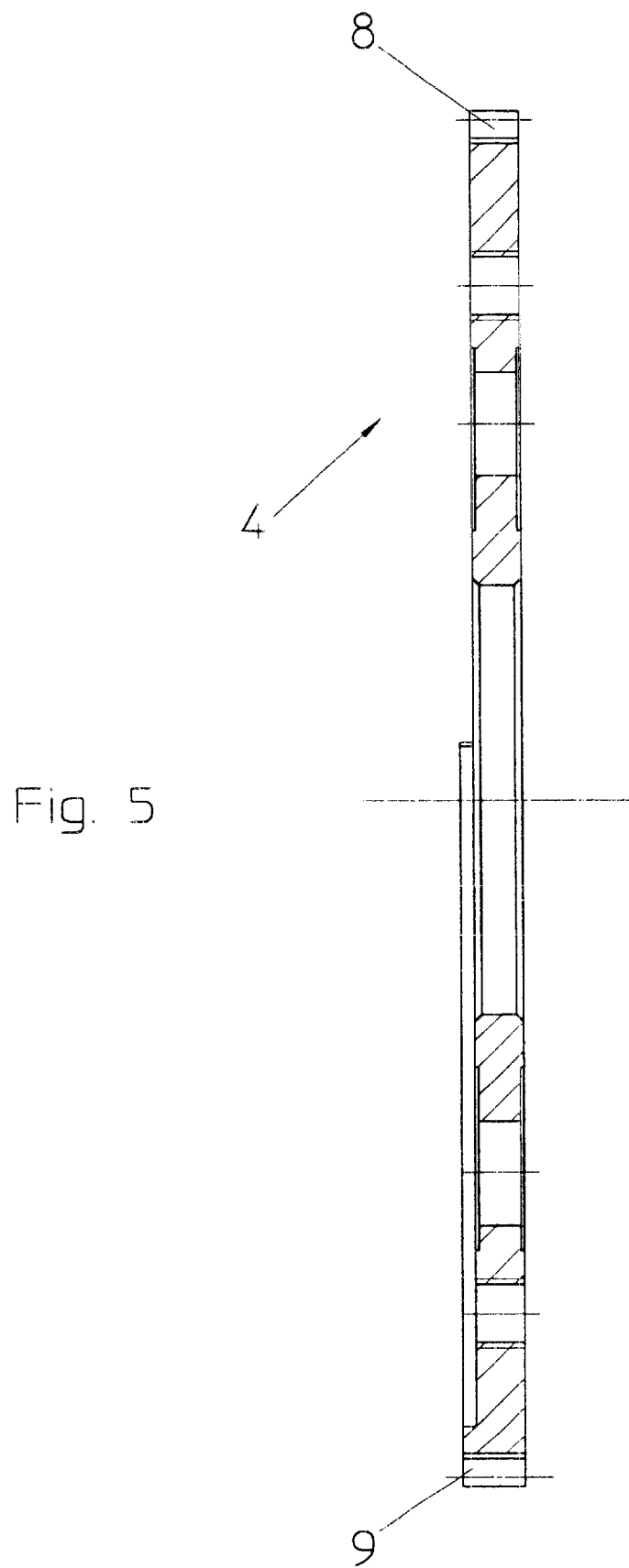
FIG. 5 an axial section of a second disc part of the combined driving and smoothing wheel.
Figure 6:
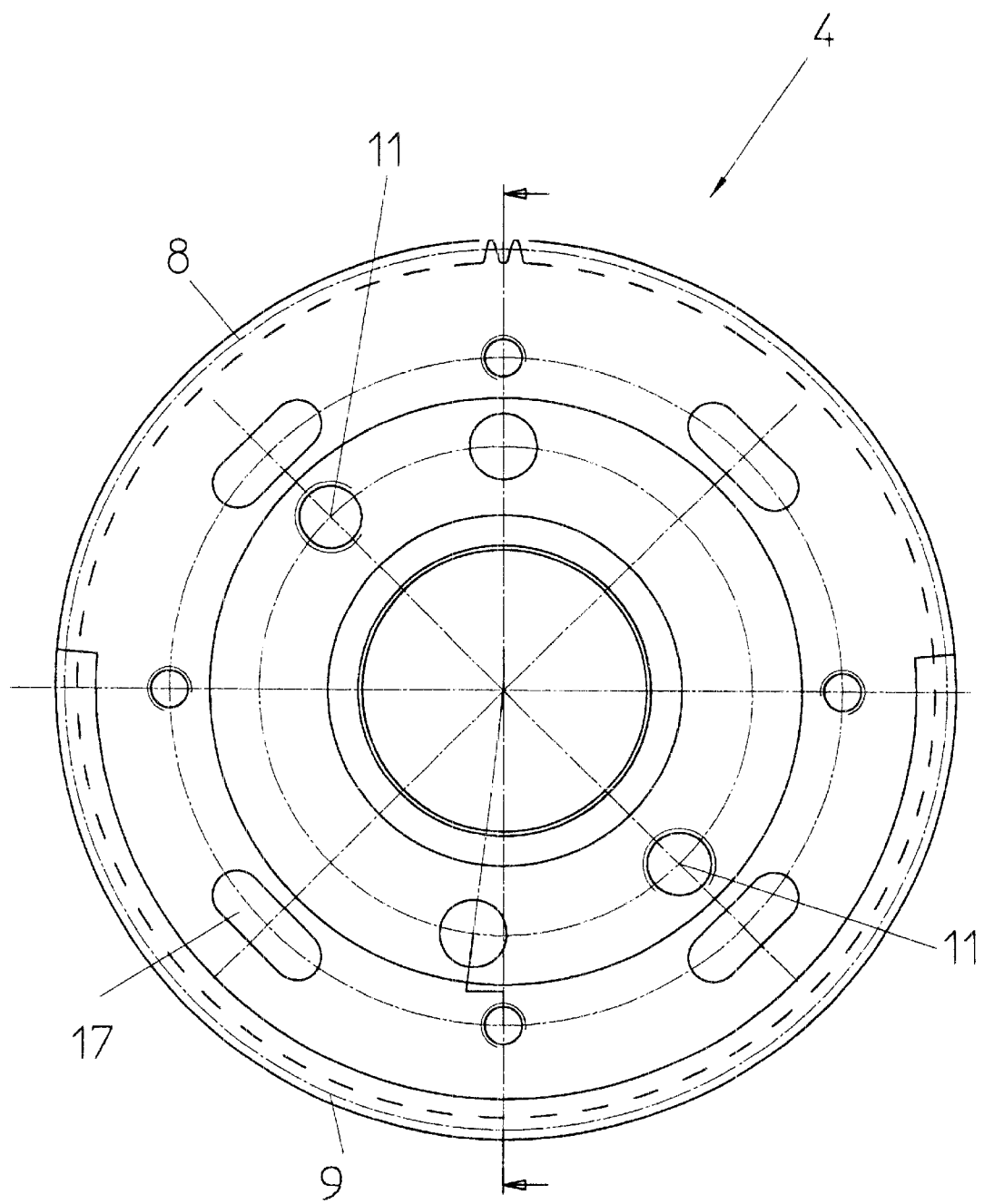
FIG. 6 a side view of the second disc part according to FIG. 5.

The tool illustrated in FIGS. 1 and 2 for chamfering and deburring the end face tooth edges of spur and helical gears comprises a first and second rolling deburring wheel 1 and 2 which receive therebetween a first and a second disc part 3 and 4. The first and second disc parts 3 and 4 together form a combination driving and smoothing wheel. The first disc part 3 is provided on both sides with hub-shaped projections 5 onto which the first rolling deburring wheel 1 as well as the second disc part 4 and the second rolling deburring wheel 2 are positioned so as to be rotationally adjustable. It can be seen that the contact surfaces of the first and second rolling deburring wheels 1 and 2 and of the first and second disc parts 3 and 4 are in parallel radial planes relative to the axis of rotation 6 of the tool. The first and second rolling deburring wheels 1 and 2 are provided about a peripheral area of approximately 160 degrees with teeth 7 which engage tooth gaps of a gear wheel-type workpiece (not illustrated) and in this way deburr and/or chamfer the end face tooth edges thereof.

Figure 7:
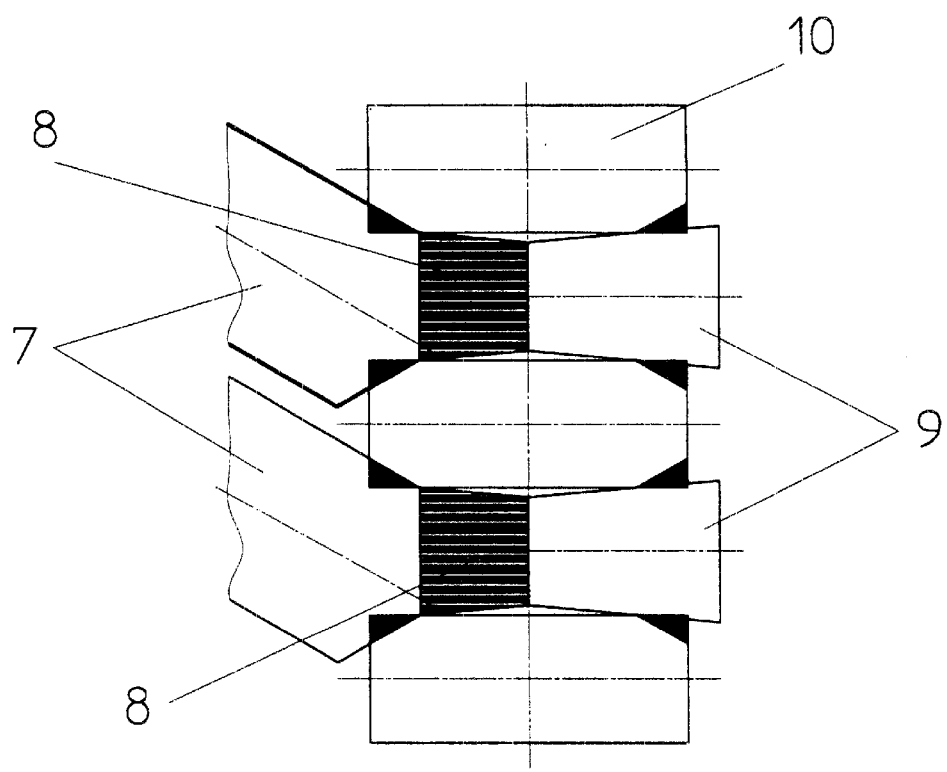
FIG. 7 shows a developed view of a section of the tool meshing area with a workpiece.

The first and the second disc parts 3 and 4 are provided about a peripheral area of approximately 170 degrees with teeth 8 which engage tooth gaps of the gear wheel (not illustrated). This area of the first and second disc parts 3 and 4 has the function of a guide wheel. In the remaining peripheral area of approximately 190 degrees, the first and the second disc part 3 and 4 are provided with conically ground teeth 9 which engage the tooth gaps of the gear wheel (not illustrated). This peripheral area of the first and second disc parts 3 and 4 has the function of a smoothing wheel in that the conical teeth 9 remove a secondary burr possibly generated by the rolling deburring wheel 1 or 2 on the flanks of the teeth 10 of the workpiece (see FIG. 7). It can be seen that the first and second disc parts 3 and 4 are widened in the peripheral area provided with the conical teeth 9 and have an outwardly projecting annular flange.

The first rolling deburring wheel 1 and the first disc part 3, respectively, the second rolling deburring wheel 2 and the second disc part 4 are assembled in such a rotational position that the peripheral area of the disc parts 3 and 4 provided with the conical teeth 9 is positioned opposite the toothless peripheral area of the rolling deburring wheels 1 and 2. Moreover, the two disc parts 3 and 4 are offset by 180 degrees relative to one another so that a peripheral area provided with teeth 8 for guiding is positioned opposite a peripheral area provided with conical teeth 9 for smoothing. With this arrangement a much improved quiet running during machining is ensured.

As has been explained already above, the conically ground teeth 9 of the first and second disc part 3 and 4 have the task of removing the burr deformations possibly generated during chamfering of the teeth 10 of the workpiece by means of the teeth 7 of the first and second rolling deburring wheel 1 and 2. In order for this removal of the burr deformations, referred to also as a secondary burr, to be performed properly, the conical teeth 9 of the first and second disc part 3, 4 must be positioned in a certain relative position to the teeth 10 of the workpiece. This relative position depends on the helix angle of the workpiece. For the reasons mentioned above, the helix angle of the workpiece however is subject to certain variations. It is therefore possible that the individual batches of the workpieces to be machined have slightly varying helix angles. In order to take into account the variations of the helix angle, the two disc parts 3 and 4 forming a combination driving and smoothing wheel can be rotated relative to one another. By a corresponding change of the angular spacing of the conical teeth 9 of the two disc parts 3 and 4, a change of the helix angle of the workpiece can be compensated. This ensures that the conical teeth 9 of the two disc parts 3 and 4 will properly mesh with the teeth 10 of the workpiece in order to smooth burr deformations which have possibly been produced during chamfering of the face end edges.

For adjusting the relative position of the combination driving and smoothing wheel formed of the two disc parts 3 and 4, two threaded bores 11 are provided in the second disc part 4 at a radial spacing to the axis of rotation 6. In the first disc part 3 two bores 12 are provided at the same radial spacing to the axis of rotation 6 but have a different angular spacing in comparison to the threaded bores 11. The threaded bores 11 can thus be brought only partially into alignment with the bores 12. By means of two slotted holes 13 in the second rolling deburring wheel 2, two adjusting screws 14 are screwed into the two threaded bores 11 of the second disc part 4. The two adjusting screws 14 have a conical face end 15 which is threaded into the correlated bore 12 of the first disc part 3. In the illustrated embodiment the threaded bores 11 in the second disc part 4 are arranged at an angular spacing of 180 degrees while the bores 12 in the first disc part 3 are arranged at an angular spacing of approximately 175 degrees. It is only important that the two threaded bores 11 can be aligned only partially with the bores 12 and that the partially overlapping bores have the same radial spacing to the axis of rotation 6 of the tool, respectively.

Figure 8:
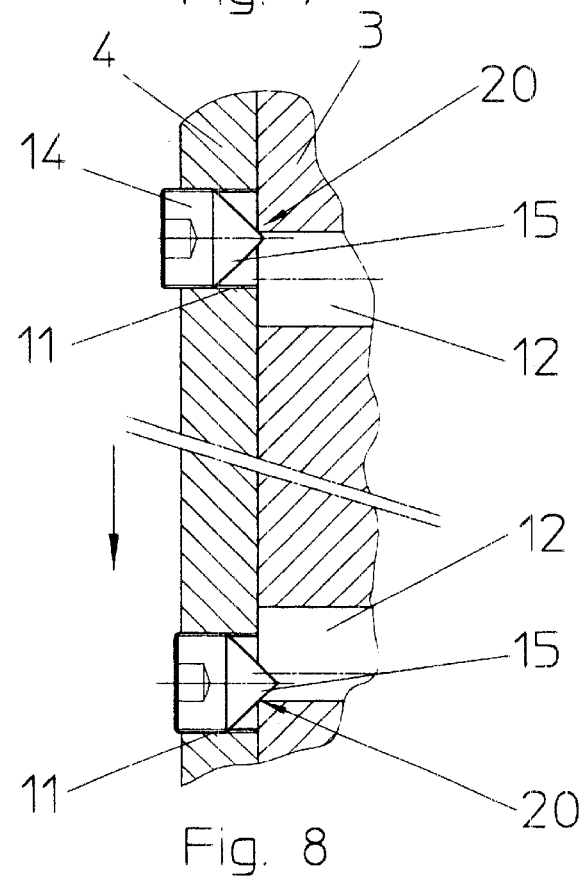
FIG. 8 shows a developed view of a section of the first and second disc parts along a hole circle.

In the first disc part 3 four threaded bores 16 are moreover provided at a radial spacing to the axis of rotation 6, and in the second disc part 4 four slotted holes 17 are provided at the same radial spacing. Clamping screws 19 are screwed into the threaded bores 16 of the first disc part 3 via corresponding slotted holes 18 in the second rolling deburring wheel 2. For adjusting the relative rotation of the first and second disc parts 3 and 4 forming the combined driving and smoothing wheel, the two adjusting screws 14, with the clamping screws 19 being released, are screwed into the threaded bores 11 of the second disc part 4 to such an extent that both conical face ends 15 contact an edge area 20 of the bores 12 of the first disc part 3 (FIG. 8). When the second disc part 4 is to be slightly rotated relative to the first disc part 3 in the direction of the arrow according to FIG. 8, the lower adjusting screw 14 is unscrewed and the upper adjusting screw 14 is tightened farther. This increases the contacting diameter of the conical face end 15 of the upper adjusting screw 14 resting against the edge area 20 of the bore 12 of the first disc part 3 and in this way effects the relative rotation of the second disc part 4 relative to the first disc part 3. When the desired relative position has been reached, the lower adjusting screw 14 is again tightened to such an extent until its conical face end 15 contacts the edge area 20 of the bore 12 and thus prevents an accidental change of the previously adjusted relative position. When the adjusting process of the relative rotational position of the two disc parts 3 and 4 is complete, the clamping screws 19 are tightened.

With a similar adjusting mechanism, which comprises also two adjusting screws 21, the relative rotational position of the two rolling deburring wheels 1 and 2 can be adjusted. By means of clamping screws 22 the first and second rolling deburring wheels 1, 2 and by means of clamping screws 19 the first and second disc parts 3 and 4 can be connected fixedly with one another in the previously adjusted relative position.

Deviating from the illustrated embodiment, the first disc part 3 can be provided with a collar so that between the two disc parts 3 and 4 a slot is formed. This slot is advantageously provided for removal of the cuttings which result from machining of the face edges which otherwise could be pressed into the tooth flanks of the workpiece. For this purpose, it would also be possible to arrange between the two disc parts 3 and 4 an additional third disc part which is provided only with teeth for guiding.

As can be taken from the above description, the teeth 9 provided on the two disc parts 3 and 4 can have a wedge profile which can be easily produced. The teeth serving for smoothing the left and right leading edges of a workpiece can be adjusted in a simple way to the respective helix angle of the workpiece to be machined. This is effected by a relative rotation of the two disc parts 3 and 4. This relative rotation for compensation of variations of the helix angle of the workpieces to be machined of different batches is very small. The proper engagement of the teeth 8 of the two disc parts 3 and 4 provided for guiding and of the teeth 7 of the two rolling deburring wheels 1 and 2 with the teeth 10 of the workpiece is not affected in this way.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A tool for chamfering and deburring of end face tooth edges of spur and helical gears, said tool comprising:

at least one rolling deburring wheel for machining the tooth edges, arranged at an end face relative to the workpiece and meshing therewith;

a toothed spacer wheel, positioned axially adjacent to the rolling deburring wheel and fixedly connected thereto and meshing with the workpiece, said spacer wheel being formed as a driving wheel about a portion of its periphery and as a smoothing wheel for machining the edge zones of the tooth flanks about the remaining portion of the periphery, wherein the spacer wheel is divided into at least two discs which are connected to one another so as to be rotationally adjustable.

2. A tool according to claim 1 wherein said at least two discs are staggered in the circumferential direction such that the area of one disc serving as a smoothing wheel is positioned opposite the area of the other disc serving as a driving wheel.

3. A tool according to claim 1 wherein one disc is provided with two threaded bores displaced in the circumferential direction and the other disc is provided with two bores which have a different angular spacing than the threaded bores and partially overlap the threaded bores, and that adjusting screws with a conical face end are threaded into the threaded bores of the one disc such that the conical face ends contact edges of the bores of the other disc only within a partial area.

4. A tool according to claim 2 wherein one disc is provided with two threaded bores displaced in the circumferential direction and the other disc is provided with two bores which have a different angular spacing than the threaded bores and partially overlap the threaded bores, and that adjusting screws with a conical face end are threaded into the threaded bores of the one disc such that the conical face ends contact edges of the bores of the other disc only within a partial area.

* * * * *